United States Patent [19]

Mazelsky

[11] 4,150,805
[45] Apr. 24, 1979

[54] CRASH SURVIVABLE SEAT

[75] Inventor: Bernard Mazelsky, West Covina, Calif.

[73] Assignee: ARA, Inc., West Covina, Calif.

[21] Appl. No.: 734,362

[22] Filed: Oct. 20, 1976

[51] Int. Cl.² ............................................. B64D 25/04
[52] U.S. Cl. ................................. 244/122 R; 297/216
[58] Field of Search ....... 244/122 R, 122 AG, 138 R, 244/151 R; 188/1 B, 1 C, 1 R; 297/216; 74/492; 52/98; 114/247

[56] References Cited

U.S. PATENT DOCUMENTS

| | | | |
|---|---|---|---|
| 2,471,166 | 5/1949 | Neff | 244/151 R |
| 2,971,566 | 2/1961 | Negroni | 188/1 C |
| 3,369,634 | 2/1968 | Mazelsky | 188/1 C |
| 3,603,433 | 9/1971 | Keathley et al. | 188/1 C |
| 3,635,314 | 1/1972 | Mazelsky | 188/1 C |
| 3,788,148 | 1/1974 | Connell et al. | 188/1 C |
| 3,922,034 | 11/1975 | Eggert | 244/122 R |

OTHER PUBLICATIONS

Mason Reilly, "Crashworthy Troop Seat Investigation" USAAMRDL-TR-74-93, Dec. 1974, pp. 53-88, 124-166.

*Primary Examiner*—Galen L. Barefoot
*Attorney, Agent, or Firm*—Albert M. Herzig; Edward C. Walsh

[57] ABSTRACT

A tri-axis crash survivable seat, utilizing a plurality of energy absorbers, which are swivel mounted to the seat bucket and also to a frame where the frame is securely fastened to the structure of a rotary wing or fixed wing aircraft. The energy absorbers are utilized in upper, intermediate and lower pairs, each having different energy absorbing characteristics, stroking distances, and force-displacement relationships from the other pairs. The energy absorbing devices attach to the bucketseat and supporting frame so as to permit tri-axial energy absorption during impact for various vertical or combined vertical impact angles. Each of the intermediate pair of energy absorbing devices is a two stage device designed to minimize the dynamic overshoot associated with the elasticity of the human body, such that a reduced probability of injury is obtained. Energy is dissipated in a controlled manner through the process of the displacement of the seat relative to the craft under arbitrary crash conditions.

6 Claims, 7 Drawing Figures

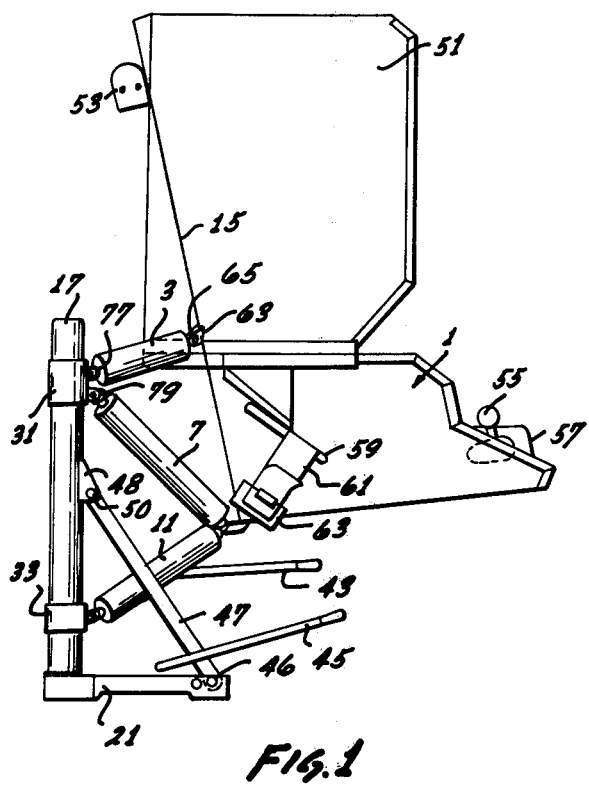

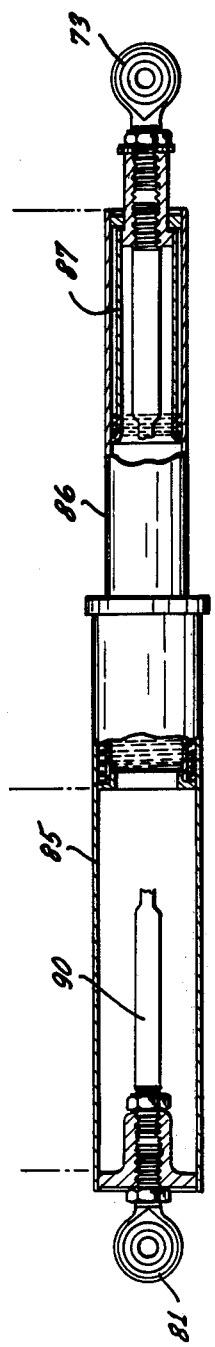
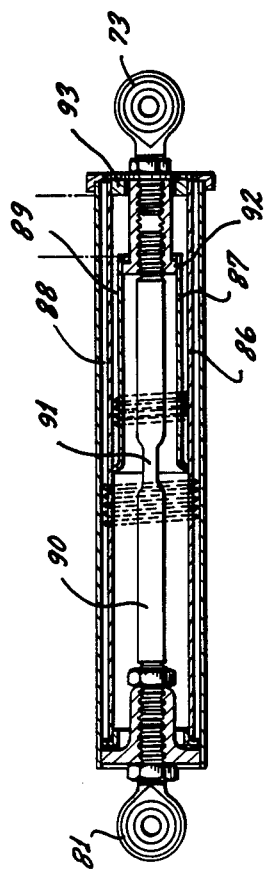
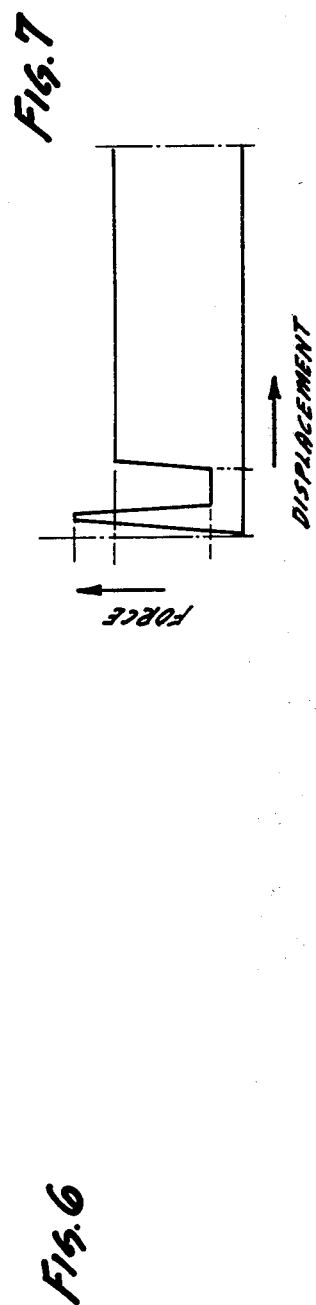

CRASH SURVIVABLE SEAT

CROSS-REFERENCE TO RELATED APPLICATIONS

Applicant hereby incorporates the subject matter disclosed in U.S. Pat. No. 4,066,149 filed Sept. 13, 1976 by Applicant.

BACKGROUND OF THE INVENTION

1. Field of the Invention

Field of the invention relates to a crash survivable seat utilizing a plurality of swivel mounted energy absorbers. Four of the energy absorbers constitute two pairs, one pair of which is high mounted and the other low mounted; each one of the said four utilizes a single layer coil of wire captured in an annular space between two concentric cylinders where the radial clearance between the concentric cylinders is dimensioned and toleranced so that the wire is squeezed to create the necessary friction force to roll when the two concentric cylinders are loaded with opposing forces. An intermediate pair of energy absorbers as disclosed in the above cross-referenced Patent Application, are also utilized and are two-stage energy absorbers having a load-stroke wave form designed to eliminate or substantially reduce oscillatory forces on the occupant and to eliminate rebound characteristics after complete stroking of the seat bucket. The improvement of the invention is the combination of the "notched" energy absorbers, mounted intermediately to the seat bucket and frame with the lower and upper pairs of absorbing devices thereby providing a force-stroke relationship that reduces the probability of injury to the occupant during arbitrary impact attitudes.

2. Description of the Prior Art

It is well known that the stroking capability of the single-axis seat during combined angle crashes may not be adequate to limit the acceleration levels on the occupant in the vertical direction. The forces accompanying the impact and accelerations that occur during rotary wing or fixed wing crashes are known to be injurious and oftentimes fatal to crew members in a combined horizontal, roll, and vertical impact configuration where a single axis energy attenuating seat system is being utilized. The single axis system inherently contains large bending moments during the energy attenuation cycle which give rise to inconsistent G loads experienced by the occupant during a vertical or combined angle crash which are usually in excess of the acceleration level the human body can withstand without injury or fatality occurring.

Since the human body is an elastic mass, it is subject to a phenomenon known as dynamic overshoot which occurs when a large shock force is applied to the human body. When the rapid acceleration and deceleration forces resulting from oscillatory motion above-referred to as dynamic overshoot of acceleration are experienced by the human body, the possibility of injury or fatality is greatly increased. It is therefore desirable to eliminate or substantially reduce the dynamic overshoot accelerations and decelerations to which the human body is subject during vertical or combined angle impacts of rotary or fixed wing aircraft. This can be accomplished by utilizing upper, intermediate, and lower pairs of energy absorbing devices which are attached to the carriage of the seat in a manner which permits tri-axis energy absorption of the seat during a vertical or combined angle impact. The intermediate pair of energy absorbers used in such a configuration incorporate a two stage energy absorption system thereby substantially minimizing and eliminating dynamic overshoot effects on the seat occupant.

SUMMARY OF THE INVENTION

The present invention relates to a tri-axis crash survivable seat having an upper, intermediate and lower pair of energy absorbing devices. The intermediate pair of energy absorbers utilize the design disclosed and described in U.S. Pat. No. 4,066,149 which is incorporated herein. These energy absorbers are not of the constant force displacement type but utilize first and second stage energy absorbing systems resulting in a "notched" force-stroke wave which is also described in said U.S. Pat. No. 4,066,149. The upper and lower energy absorbing devices, however, have an initial linear force displacement relationship for relatively short movement of the seat and thereafter the force-displacement relationship is constant. The upper and lower energy absorbing devices operate on the principle which was disclosed in U.S. Pat. No. 3,369,634 where two or more concentrically related tubes are so arranged that the tubes can move in a telescopic fashion relative to each other. Each tube is constructed such that an annular space with predetermined tolerance limits exists between adjacent tubes. A precisely sized helical coil is located within the annular space and undergoes continuous deformation between the adjacent walls of the tubular members upon telescopic displacement of the tubes thereby dissipating and absorbing energy. The relative movement in terms of distance between the concentric tubes or telescopic displacement is called "stroke distance".

Upon impact, shock forces transmitted to the rotary or fixed wing aircraft seat under a combined angle impact or vertical impact result in the upper and intermediate energy absorbing devices stroking and rotating downward. The lower energy absorbing device however strokes negatively as it rotates downwardly; in other words, experiences initial compressive forces as the center of gravity of the combined seat and occupant move downward with respect to the floor of the craft structure. Energy is dissipated and controlled by the plastic deformation of the helical wire captured in the annular space between the tubular members of each energy absorber. The utilization of the intermediate energy absorbers in the design configuration as described results in a load force-stroke which decreases probability of injury to the occcupant.

It is therefore an object of the present invention to provide a crash survivable rotary wing or fixed wing aircraft seat under combined angle or vertical angle ground impacts.

It is a further object of the present invention to provide an arrangement of lower, intermediate and upper energy absorbing devices fastened to the seat bucket such that downward movement of the seat caused by combined angle or vertical impacts with the ground substantially reduces the dynamic overshoot accelerations on the occupant of the seat.

It is also an object of the present invention to provide a tri-axis crash survivable seat utilizing an upper pair, intermediate pair, and lower pair of energy absorbing devices where the upper and lower pairs are concentric tubular members, having an annular region between said tubes which is occupied by a helical wire, which dissipates energy under plastic deformation through relative displacement of said tubular members; and where the intermediate energy absorber operates in stages producing a notched force-stroke wave to attenuate energy, with the combination of all the pairs operating simultaneously during impact substantially reducing the probability of injury due to the dynamic overshoot phenomenon.

Further objects and additional advantages of the invention will become apparent from the following detailed description and annexed drawings.

BRIEF DESCRIPTION OF DRAWINGS

FIG. 1 is a side view of the crash survivable seat.

FIG. 2 is an isometric view, depicting the rear of the seat.

FIG. 3 is a side view of the seat, illustrating said seat in a stroked configuration.

FIG. 4 is an isometric view of the rear of the seat, depicting the tri-axis arrangement of the energy absorbing devices.

FIG. 5 is a fragmented section view of the intermediate energy absorber in the stroked configuration.

FIG. 6 is a section view of the intermediate energy absorber in the unstroked configuration.

FIG. 7 is the force-stroke wave form representation of the intermediate energy absorbing device.

DETAILED DESCRIPTION OF THE PREFERRED EMBODIMENT

The preferred embodiment of this invention is shown in perspective on FIGS. 2 and 4 where the assembled elements comprising the seat structure can be viewed with particularity. It can be seen on FIG. 2 that the seat structure incorporates three basic components; namely, the bucket seat 1, the supporting carriage assembly 2, and a plurality of symmetrically mounted energy absorbing devices linking the seat 1 and carriage 2. Energy absorbers 3 and 5 form the upper pair of energy absorbers, energy absorbers 7 and 9 or notched energy absorbers form the intermediate pair. As will be hereinafter described in more detail, said plurality of energy absorbing devices connect the back plate 15 of seat bucket 1 to carriage assembly 2, where said carriage assembly is fastened in the preferred representation to a helicopter structure by suitable fastening means permitting fore and aft seat adjustments.

Referring again to FIG. 2, carriage assembly 2 embodies in its construction vertical columns 17 and 19 which are rigidly fastened to rail guides 21 and 23. As can be seen on FIG. 2, columns 17 and 19 are of similar design and symetrically mounted, and, therefore, a description relating to column 17 and its attachment to the helicopter will contain the detail necessary to fully describe column 19 and its attachment to the helicopter. Continuing therefore with the description of column 17, column 17 is rigidly fastened to rail guide 21 by fastener 25 and rail guide 21 articulates with rail 27 which is securely fixed to the helicopter structure, thereby permitting fore and aft positioning of seat 1 by the occupant of the seat.

Carriage assembly 2 also incorporates in its structure a truss frame 29 which, as can be seen by reference to FIG. 2, is symmetrical with respect to vertical columns 17 and 19. As shown in FIG. 4, frame 29 embodies a horizontal upper brace connecting member 30, a horizontal lower brace connecting member 32 and intersecting diagonal members 34 and 36 where the terminations of said respective support members are securely attached by welding or other suitable means to collars 31, 33, 35 and 37. Collars 31 and 33 are in vertical alignment and concentric with column 17 such that said collars may slide relative to the column during seat adjustment. Similarly, collars 35 and 37 are in vertical alignment and concentric with column 19 for vertical movement in the same manner previously described for column 17.

Vertical adjustment of the helicopter seat by the occupant is accomplished by moving frame 29 through suitable mechanical linkage means in a vertical direction relative to columns 17 and 19; said linkage means by which frame 29 is vertically adjustable includes helical springs 39 and 41 and vertical seat adjustment lever 43.

As shown in FIG. 3, the lower terminus of diagonal brace 47 is fastened to rail guide 21 by bolt 46 and the upper terminus of said brace 47 is secured to mounting plate 48 by bolt 50. Mounting plate 48 is fixed to column 17 by suitable means. Since carriage 2 is of a symmetrical design, the foregoing description applies to the modus by which diagonal brace 45, shown on FIG. 4 is structurally attached to rail guide 23 and vertical column 19.

In the illustrated side view of the embodiment, as shown on FIG. 1, bucket seat 1 may be equipped with an armor plate 51 which is attached to said bucket seat by suitable means, where said armor plate 51 may be utilized when the helicopter is to be used under combat conditions. Further helicopter seat components are illustrated in FIG. 1. Specifically, inertia reel 53 and inertia reel locking control 55 which are used in conjunction with the seat shoulder straps for securing the upper torso of the seat occupant to said seat. Bucket seat 1 is equipped with a cushion 57 which may be of a tempered foam configuration. The foam provides for distribution of pressure points between the human body and the bottom of the seat bucket. The cushion may be covered with a fire retardant or fire resistant cover, and may be attachable to the seat bucket by Velcro strips. Seat cushion 57 may also incorporate wire mesh to promote ventilation and durability. A suitable thickness of foam and mesh is utilized to minimize deflection and subsequent rebound during vertical impacts or combined angle impacts of the helicopter. FIG. 1 also illustrates the seat belt attachment where seat belt webbing 61 is shown passing through slot 59 and securing to buckle 63.

The plurality of energy absorbing devices depicted in FIGS. 1, 2 and 4, are shown in the pre-impact or non-stroked configuration. The modus of connections of said energy absorbing devices between frame 29 and helicopter seat back 15 are best illustrated on FIG. 4 where it can be seen that absorbing devices 3, 7, and 11 are swivel mounted to back plate 15 of seat bucket 1, and as shown on FIG. 1, energy absorbing devices 3 and 7 are also swivel mounted to collar 31 of frame 29; energy absorbing device 11 of the lower pair is swivel mounted to collar 33 of frame 29. Energy absorbing devices 5 of the upper pair, 9 of the intermediate pair, and 13 of the lower pair are symmetrically positioned with respect to their counterpart members, namely, energy devices 3, 7 and 11, and are swivel mounted in the same manner to frame 29 and back plate 15. As more particularly shown in FIG. 4, the respective energy absorbing devices are swivel mounted utilizing pinned ball joints, as for example ball joint 61 articulates with receptacle socket 63 by pin 65, said pin 65 may be retained in place through the use of a nut or other suitable retaining means. At the lower section of backplate 15, energy absorbers 7 and 11 are swivel mounted to bracket 67 which contains receptacle sockets 69 and 71 integrally secured to said bracket 67 by being welded thereto or by other integral means. Said energy absorbers are pinned to receptacle sockets 69 and 71 as shown on FIG. 4 by pins 76 and 78 for rotation relative to said sockets. As further shown on FIG. 4, energy absorbers 3 and 7 are also swivel mounted to collar 31 of frame 29; this connection is also illustrated on FIG. 1 where receptacle sockets 77 and 79 are rigidly mounted to collar 31 by welding means or other suitable means and are connected to ball joints 81 and 83 by a pin in the manner described for the swivel connection between ball joint 61 of energy absorber 3 and receptacle socket 63.

FIG. 3 is a representation of the operational characteristics of the crash survivable helicopter seat. By referring to FIG. 3, the relative positions of seat 1 prior to and after impact are shown where said impact may be vertical or a combined angle vertical impact. A combined vertical impact is one which may include helicopter roll and pitch during impact. Referring now to FIG. 3, after the impact has occurred the upper energy absorbers 3 and 5, and intermediate energy absorbers 7 and 9 have absorbed energy through their being extended by the forces of impact. The lower energy absorbers 11 and 13 at the conclusion of impact have rotated to a low position; however said lower energy absorbers have undergone compressive forces but nevertheless have absorbed energy in the process. The upper and lower energy absorbers in the preferred configuration of this invention are like those of U.S. Pat. No. 3,369,634. The manner in which energy is absorbed by the upper and lower energy absorbers is described in U.S. Pat. No. 3,369,634 and utilizes two symmetric tubes which can move in a telescopic fashion relative to each other. The absorbing device is constructed so that an annular space exists between the adjacent tubes within which a precisely sized helical coil is located. Telescopic displacement of the tubes will result in deformation of the helical coil resulting in the dissipation and absorption of energy.

The intermediate energy absorbing devices 7 and 9 are designed to absorb and dissipate energy in stages. These stages correspond to the notched force-stroke wave as shown on FIG. 7 where the vertical axis in said FIG. 7 represents force and the horizontal axis represents displacement or stroke distance.

Referring now to FIGS. 5 and 6, the intermediate energy absorbing device or notched energy absorber consists of tubular elements 85, 86 and 87, which are concentrically arranged and capable of telescopic relative motion to each other by the application of forces to ball joint ends 73 and 81. An annular space is formed between said tubular elements shown by characters 88 and 89 on FIG. 6, where annular space 88 for example has contained within it a helical coil so arranged that each turn of said coil also comprises an arcuate body which is subjected to cyclic plastic deformation in tension and compression by rotation when relative movement occurs between tubes 86 and 87. A rod 90 is fixed between the ends of the tubular members and is suitably fastened to ball joints 73 and 81 where said rod has an area 91 of deliberate weakness such that said bar will break when a pre-determined force is applied thereto.

In operation, the intermediate energy absorbers as shown on FIGS. 5 and 6, which represents energy absorbers 7 and 9 in the preferred embodiment of the invention as described herein, will not stroke until rod 90 ruptures which occurs when a pre-determined amount of force is applied. Thereafter tube 87 will move relative to tube 86 as the energy absorbing device begins its downward stroke; energy is initially dissipated by the helical coil within annular groove 89. When shoulder 92 strikes shoulder washer 93, tube 86 then begins to move relative to tube 85. In the annular space between said tubes 85 and 86, the helical coil then begins to absorb energy through plastic deformation. The force-stroke or displacement relationship obtained through the use of the intermediate energy absorbers decreases the probability of injury to the occupant.

In summary, an upper, intermediate and lower pair of energy absorbing devices are swivel mounted to the helicopter seat bucket and carriage respectively where said carriage is structurally secured to the helicopter. The energy absorbing devices constituting the upper and lower pairs have two concentric tubes with a helical wire occupying the annular region contained between said tubes where telescopic movement therebetween results in plastic deformation of said helical wire, thereby absorbing energy. The intermediate pair of energy absorbers operates so as to produce a notched wave form as shown on FIG. 7 which minimizes dynamic overshoot and reduces the cumulative probability of injury under arbitrary crash conditions. The plurality of energy absorbers are mounted such that the crash impact forces acting on the occupant along the vertical, pitch and roll axis of the aircraft, are attenuated when transferred to the seat, and the oscillatory forces acting on the occupant during the stroking of the energy absorbers are substantially reduced or eliminated.

From the foregoing, those skilled in the art will readily understand the nature of the invention, its construction and operation, and the manner in which it achieves and realizes all of the objects and advantages as set forth in the foregoing as well as its many additional advantages that are apparent from the detailed description.

I claim:

1. An improved crash survivable seat for rotary wing and fixed wing aircraft of the type having a seat bucket, a carriage for said seat bucket secured to the craft structure, and a plurality of energy absorbing devices interconnecting said seat bucket and carriage, said plurality of energy absorbing devices including at least one upper pair of energy absorbing devices and at least one lower pair of energy absorbing devices, wherein the improvement comprises:

said upper pair and said lower pair of energy absorbing devices being operable to absorb energy in both tension and compression and having the capability of absorbing energy at all times during crash induced motion;

energy absorbing means interconnecting said seat bucket and said carriage for controlled transfer of force to said seat in stages wherein said energy absorbing means is responsive to crash induced seat displacement, said energy absorbing means comprising at least one pair of energy absorbing devices disposed intermediately of said upper pair of energy absorbing devices and said lower pair of energy absorbing devices including:

first rupturable means responsive to initial crash induced forces for transfer of force to said seat to a predetermined maximum value;

second elastically deformable means responsive to crash induced seat displacement for absorption of energy at a substantially constant force transfer below said predetermined maximum value of said first means;

third elastically deformable means responsive to crash induced seat displacement for absorption of energy at a substantially constant force transfer intermediate to the force values of said first and second means; and means for connecting each said energy absorbing means to said seat and said carriage for permitting concurrent vertical lateral and longitudinal displacements of said seat for arbitrary crash angles, the response of said first means, said second means and said third means occurring sequentially with a force-displacement relationship substantially as shown by the graph:

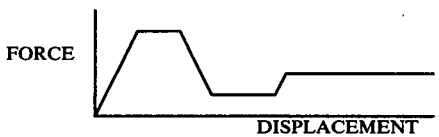

2. The invention as set forth in claim 1 further including a first receptacle pair carried by said seat bucket and a second receptacle pair carried by said carriage, said first receptacle pair articulating with one pair of ball joint ends of said upper pair of energy absorbing devices, and said second receptacle pair articulating with said pair of other ball joint ends of said upper pair of energy absorbing devices, such that said upper pair of energy absorbing devices is pivotably coupled to said seat bucket and to said carriage.

3. A crash survivable seat for aircraft comprising:
a seat bucket;
a carriage secured to said aircraft, said seat bucket being attached to said carriage;
a plurality of energy absorbing means connected between said seat bucket and said carriage, said energy absorbing means comprising upper energy absorbing means, lower energy absorbing means, and intermediate energy absorbing means, the latter comprising first rupturable means responsive to initial crash induced forces for transfer of force to said seat only until a predetermined maximum value of force has been reached, second elastically deformable means responsive to crash induced seat displacement for absorption of energy thereafter at a substantially constant force below said predetermined maximum value of said first energy absorbing means, and third elastically deformable means responsive to crash induced seat displacement for absorption of energy at a substantially constant force below said predetermined maximum value of said first means, and different from the force at which said second means absorbs energy, said upper and said lower energy absorbing means being operable to absorb energy in both tension and compression and having the capability of absorbing energy at all times during crash induced motion, said plurality of energy absorbing means being connected between said seat bucket and said carriage at such different angles as to provide for energy absorption upon displacements in a vertical, fore-and-aft or laeral direction.

4. The invention as set forth in claim 3 wherein said upper energy absorbing means comprises at least an upper pair of energy absorbers, and wherein said lower energy absorbing means comprises at least a lower pair of energy absorbers, and wherein said intermediate energy absorbing means comprises at least an intermediate pair of energy absorbers.

5. The invention as set forth in claim 3 wherein said third means absorbs energy at a substantially constant force intermediate between said predetermined maximum value of force of said first means and said substantially constant force of said second means.

6. The invention as set forth in claim 3 wherein said first means, said second means and said third means respond sequentially to a crash with a force-displacement relationship substantially as shown by the graph:

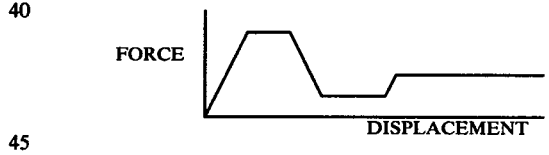

* * * * *